Figure 1:
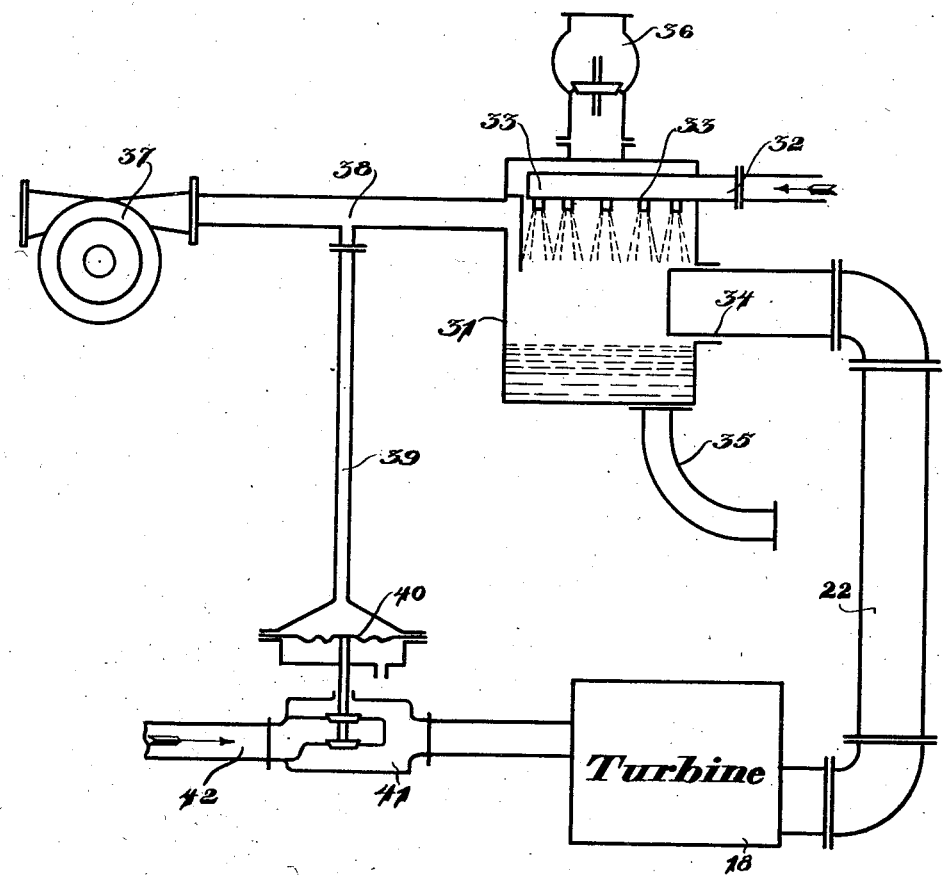

May 18, 1926.

R. N. EHRHART

HEAT CONSERVING APPARATUS

Original Filed Nov. 21, 1917     2 Sheets-Sheet 1

1,584,758

WITNESS
W. S. Beckley

Raymond N. Ehrhart
INVENTOR

BY L. C. Davis
ATTORNEY

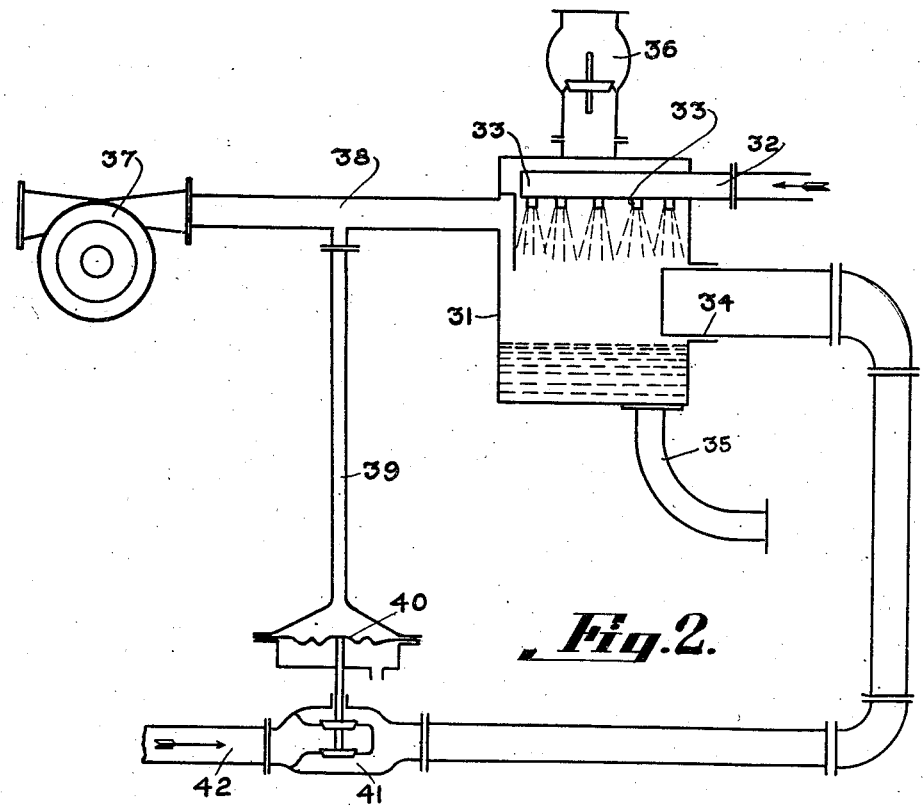
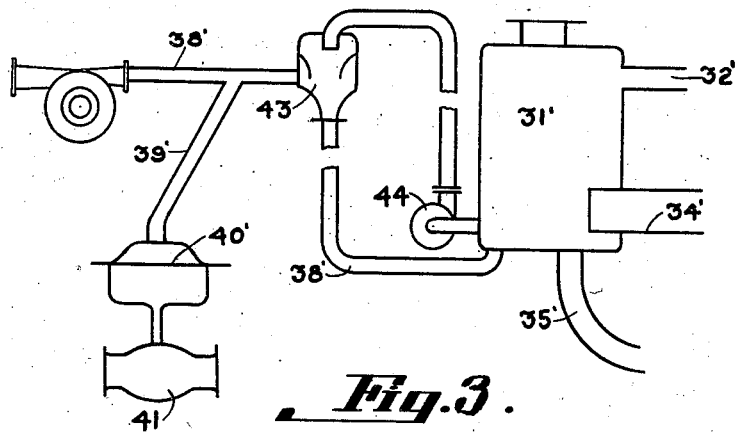

Patented May 18, 1926.

1,584,758

UNITED STATES PATENT OFFICE.

RAYMOND N. EHRHART, OF EDGEWOOD, PENNSYLVANIA, ASSIGNOR TO WESTINGHOUSE ELECTRIC & MANUFACTURING COMPANY, A CORPORATION OF PENNSYLVANIA.

HEAT-CONSERVING APPARATUS.

Original application filed November 21, 1917, Serial No. 203,261. Divided and this application filed May 19, 1920. Serial No. 382,653.

This invention relates to the conservation of heat in power developing systems and has for an object to produce a new and improved apparatus for preventing or reducing the loss of heat from such a system.

In power plants the feed water for the boilers or steam generators is often heated by exhaust steam from the auxiliaries; that is, by steam exhausted from the turbines or engines which drive the circulating pumps, air pumps, feed water pumps and the like.

The load on the auxiliaries is substantially constant irrespective of the load on the main power developing units, consequently under some operating conditions the amount of exhaust steam available for feed heating purposes may be considerably in excess of that required. For example, when the main units are operating under light loads the amount of feed water to be heated is small, but the steam delivered by the auxiliaries is approximately the same as under full load conditions and consequently is in excess of the amount required to heat the feed water to the desired temperature. As a result the excess steam is discharged to the atmosphere with the attendant heat loss to the system. It is evident that it is desirable to proportion the amount of available exhaust steam for heating feed water to the amount of feed water to be heated, so that all of the available heat in the exhaust steam will be economically utilized.

A more specific object of my invention is to produce an apparatus for maintaining a balance between the amount of exhaust steam available for feed water heating and the amount of feed water to be heated.

A further object is to produce a power developing apparatus in which the load on the steam driven auxiliaries is varied in accordance with the amount of exhaust steam required for feed water heating purposes.

A further object is to produce new and improved apparatus for controlling the delivery of steam to the feed water heater.

These and other objects are attained by means of apparatus embodying the features herein described and illustrated in the drawings accompanying and forming a part hereof.

In the drawings, Figs. 1 and 2 are diagrammatic sectional views of an embodiment of my invention; and Fig. 3 is a diagrammatic sectional view of a modification of the apparatus illustrated in Figs. 1 and 2.

In Figs. 1 and 2, I show an automatic device for controlling the delivery of steam to an auxiliary turbine, which exhausts to a feed-water heater, or for controlling the delivery of steam directly to a feed-water heater so as to proportion the amount of steam to the amount of feed water for the purpose of maintaining a substantially constant temperature of the feed water.

A feed water heater 31, of the open or direct contact type, is adapted to receive water to be heated through an inlet port 32 and a group of distributing nozzles 33 located in the upper part of the heater. Exhaust steam for heating the water is conducted from the auxiliary turbine 18 by a pipe 22 and enters the heater through an inlet port 34, where it is condensed by the water falling from the nozzles 33. The heated water is collected in the bottom of the heater and may be drawn off through a conduit 35. An atmospheric relief valve 36 is provided in the top of the heater for preventing the building up of pressure in the heater. This valve opens outwardly only and is merely a safety valve.

As shown, the heater 31 is connected with an air pump 37 by means of a conduit 38. A branch pipe 39 transmits the pressure existing in the conduit 38 to a diaphragm 40, which controls a valve 41 in the steam line 42. As shown, the diaphragm is exposed on one side to the pressure of the fluid in the conduit 38, and on the other side to atmospheric pressure. The steam line 42 delivers actuating steam to the auxiliaries to be subsequently employed in the heater, as illustrated diagrammatically in Fig. 1, or else directly to the heater, as may be seen from Fig. 2. It is desirable to maintain a feed water temperature of say 212° F. With the water in the heater 31 at this temperature the air pump 37 is incapable of reducing the pressure in the heater below atmospheric pressure because the water vaporizes so rapidly that the formation of a vacuum is prevented. In other words, the pressure in the heater cannot be reduced below the pressure corresponding to the vaporizing temperature of the water in the heater. If this temperature drops, due to a more or less complete failure of the steam supply or for any reason, then the pressure in the heater, the conduit 38 and the pipe 39 drops accordingly. The pressure of the atmosphere acting on the diaphragm 40 opens the valve 41, admits more steam to the auxiliaries or to the heater and thereby augments the supply of steam to the heater sufficiently to reestablish a feed water temperature of substantially 212° F.

With the air pump 37 operating, any decrease in temperature of the water will cause a corresponding decrease in pressure and the latter will cause the supply of steam to be augmented by reason of the diaphragm 40 and the valve 41, so as to restore the previous temperature. As the temperature rises the valve 40 is correspondingly closed so that no steam need be wasted from the system.

In Fig. 3 I have illustrated a system similar to the system illustrated in Figs. 1 and 2, in which similar numerals distinguished by a prime mark designate similar parts. In addition to the apparatus previously described, I have provided a small auxiliary condenser 43 in the conduit 38′ connecting the heater 31′ with the air pump, and a small centrifugal pump 44 for withdrawing water from the heater and for delivering it to the auxiliary condenser 43 to be employed as cooling water.

Under some conditions, the temperature of the water in the heater 31′ may fall too low; for example because of a sudden change in temperature or quantity of water supplied to the heater. With the apparatus illustrated in Figs. 1 and 2, an objectionable vacuum might result in the line supplying steam to the heater. With the apparatus illustrated in Fig. 3, the vacuum would exist only in the small auxiliary condenser 43, which is preferably located above the heater 31′ so that it will not be flooded under high vacuum. The temperature of the water in the auxiliary condenser 43 is substantially the same as the temperature in the heater 31′, consequently the control of the steam supply to the auxiliaries is the same as in the apparatus illustrated in Figs. 1 and 2 with the added advantage that only the auxiliary condenser 43 need be subjected to pressures less than atmospheric.

While I have shown my invention in two forms, it will be obvious to those skilled in the art that it is not so limited but is susceptible to various other changes and modifications without departing from the spirit, and I desire, therefore, that only such limitations shall be placed thereupon as are imposed by the prior art or as are specifically set forth in the appended claims.

What I claim is:

1. The combination of a feed-water heater, a water-inlet means therefor, a steam-inlet means, a feed-water discharge means, air-discharge means for said heater including a pump, and means responsive to pressure in said air-discharge means to control the admission of steam to said heater.

2. In a heat conserving apparatus, a feed water heater, means for delivering steam to the heater, means for maintaining a pressure within the heater corresponding to the boiling temperature of the water in the heater, and means responsive to variations in said pressure for controlling the delivery of steam to the heater.

3. In power-plant apparatus, the combination of a feed-water heater, exhausting means for the heater for maintaining the pressure therein at the vapor pressure corresponding to the temperature of the water, means for supplying steam to the heater, and controlling means for the supply means responsive to the heater pressure to control the amount of steam supplied to the heater.

4. In power-plant apparatus, the combination of an open or contact heater, means connected to the heater above the water level for exhausting air therefrom, a conduit for supplying steam to the heater, a valve in the conduit, and a pressure-responsive device subject to the heater pressure and connected to said valve.

5. In power-plant apparatus, the combination of an open or contact feed-water heater, an air pump connected to the heater above the level of water therein, a conduit for supplying steam to the heater, a valve in the conduit, and means subject to the heater pressure for moving the valve in an opening direction upon a decrease of heater pressure and for moving the valve in a closing direction upon an increase in heater pressure.

6. In power-plant apparatus, the combination of a feed-water heater means for admitting water and steam to the heater exhausting means for the heater, and means responsive to the vapor pressure of the water in the heater for controlling the admission of steam to the heater.

7. In power-plant apparatus, the combination of a feed-water heater, a power developing unit, means for admitting water to the heater, means for admitting steam to the power-developing unit and for conducting the exhaust thereof to the heater, means for maintaining in the heater a pressure substantially equal to the vapor pressure corresponding to the temperature of the water within the heater, and means responsive to the vapor pressure of the water in the heater for controlling the admission of steam to the heater.

In testimony whereof, I have hereunto subscribed my name this 15th day of May, 1920.

RAYMOND N. EHRHART.